United States Patent
Kohl et al.

(12) 
(10) Patent No.: US 6,333,581 B1
(45) Date of Patent: Dec. 25, 2001

(54) ALTERNATOR WITH EXCITING MEANS ARRANGEMENT

(75) Inventors: Walter Kohl, Lauffen; Istvan Ragaly, Schwieberdingen; Alexander Shendi, Asperg; Hans-Peter Groeter, Vaihingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,508

(22) PCT Filed: Jul. 28, 1999

(86) PCT No.: PCT/DE99/02296

§ 371 Date: May 31, 2000

§ 102(e) Date: May 31, 2000

(87) PCT Pub. No.: WO00/07283

PCT Pub. Date: Feb. 10, 2000

(30) Foreign Application Priority Data

Jul. 30, 1998 (DE) .............................................. 198 38 285

(51) Int. Cl.[7] .................................................. H02K 19/36
(52) U.S. Cl. ......................... 310/263; 310/68 D; 310/180
(58) Field of Search ..................................... 310/113, 114, 310/68 D, 263, 179, 180, 184, 203, 206, 208; 322/58, 89, 28; 336/115–119, 120, 130, 132

(56) References Cited

U.S. PATENT DOCUMENTS

| | | | |
|---|---|---|---|
| 3,522,520 | 8/1970 | Goldman | 310/113 |
| 3,614,593 | 10/1971 | Lace | 310/113 |
| 4,612,486 | 9/1986 | Ban et al. | 318/254 |
| 5,770,909 | 6/1998 | Rosen | 310/113 |

FOREIGN PATENT DOCUMENTS

| | | |
|---|---|---|
| 30 34 735 A | 4/1982 | (DE) . |
| 33 20 644 A | 12/1984 | (DE) . |
| 33 34 950 A | 4/1985 | (DE) . |
| 0 680 060 A | 11/1995 | (EP) . |
| 2 521 766 A | 8/1983 | (FR) . |

Primary Examiner—Tran Nguyen
(74) Attorney, Agent, or Firm—Michael J. Striker

(57) ABSTRACT

The electrical machine, in particular a three-phase generator, has a stator (21) secured in a housing (10) and a claw pole rotor (23) which is secured on a shaft (13) and has an exciter winding (28). Between the claw pole rotor and a bearing plate (17) that closes off the housing, there is an electrical repeater (29) for exciting the exciter winding (28). The primary winding (30) is disposed along with the core (36, 41, 47) on the bearing plate (17). The primary and secondary windings (30, 31) of the repeater (29) are disposed between the bearing plate (17) and the claw pole rotor system (23); the primary winding (30) is disposed in a stationary core (36, 41, 47), and the secondary winding (31) is disposed in a rotating core (35, 42, 48), and the windings are coupled via an air gap (38).

11 Claims, 5 Drawing Sheets

ALTERNATOR WITH EXCITING MEANS ARRANGEMENT

PRIOR ART

Figure 1:
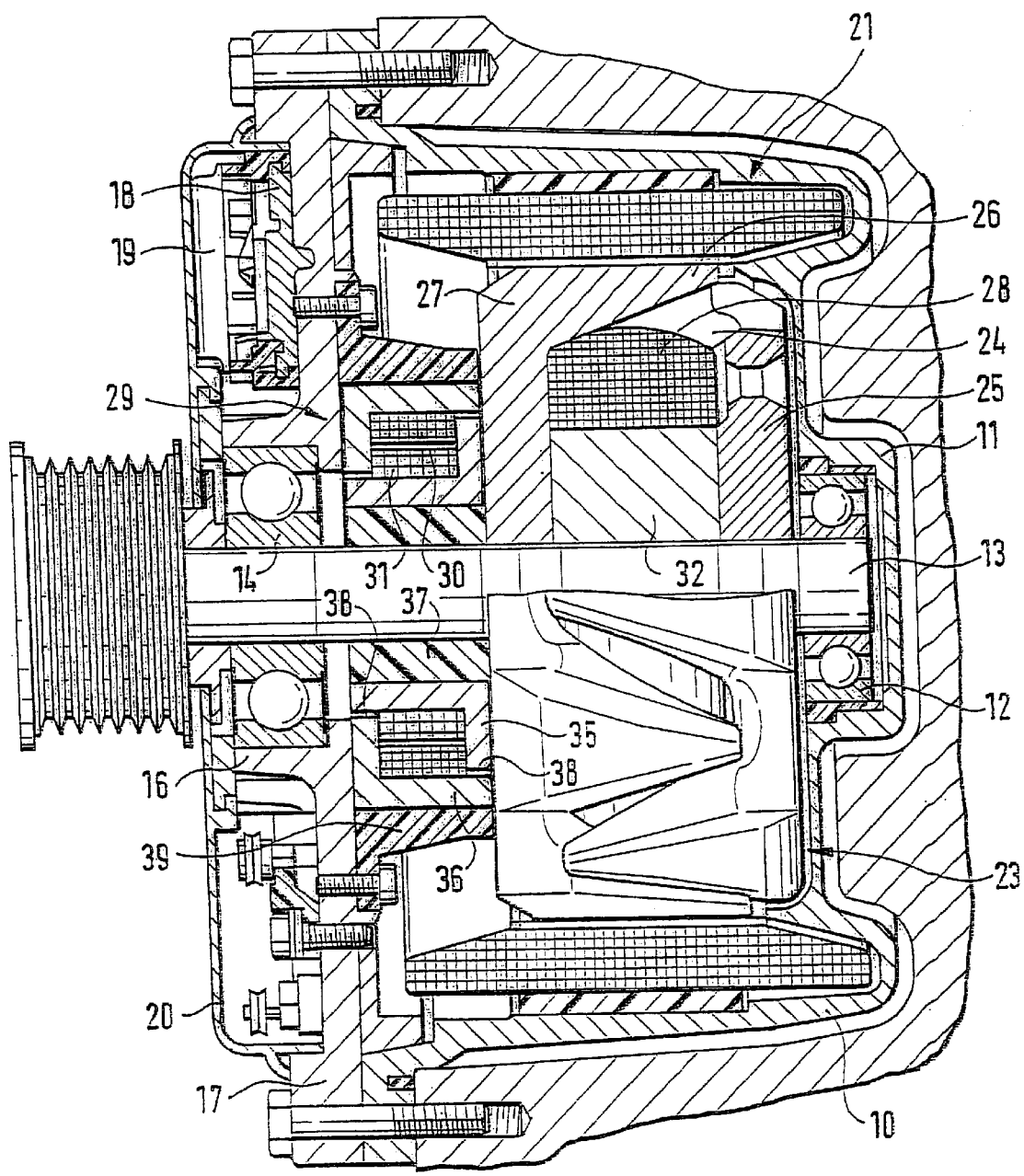

The invention is based on an electrical machine, in particular a three-phase generator, as defined generically by the main claim. One such machine is known from U.S. Pat. No. 3,522,520, for example. The energy supply to the exciter system is very compactly embodied as a rotating repeater; that is, the primary and secondary windings of the repeater are located in solid stator and rotor parts, but as a result the weight of this exciter system is relatively high, which is a disadvantage, especially when the three-phase generator is installed in a motor vehicle.

ADVANTAGES OF THE INVENTION

The electrical machine of the invention as defined by the characteristics of the body of the main claim has the advantage of the prior art that the repeater for the exciter system is very compact in structure and light in weight; that a reduction in stray inductance and above all an optimization of the magnetic circuit or reduction of expenses is attained by means of difference soft, magnetic materials in the rotating and the stationary yoke.

Further advantageous features of the invention will become apparent from the dependent claims, the ensuing description, and the drawing.

DRAWING

Figure 3A:
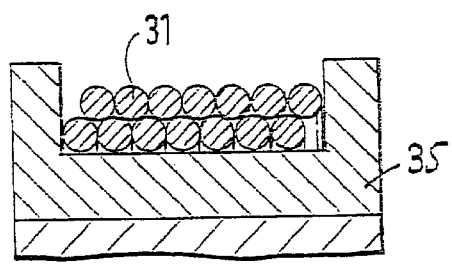
Figure 3B:
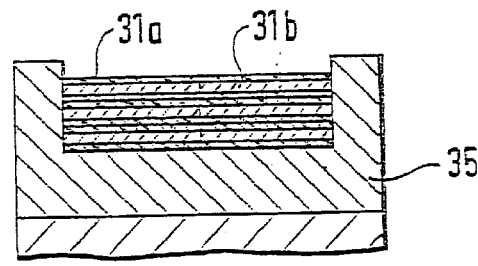
Figure 4A:
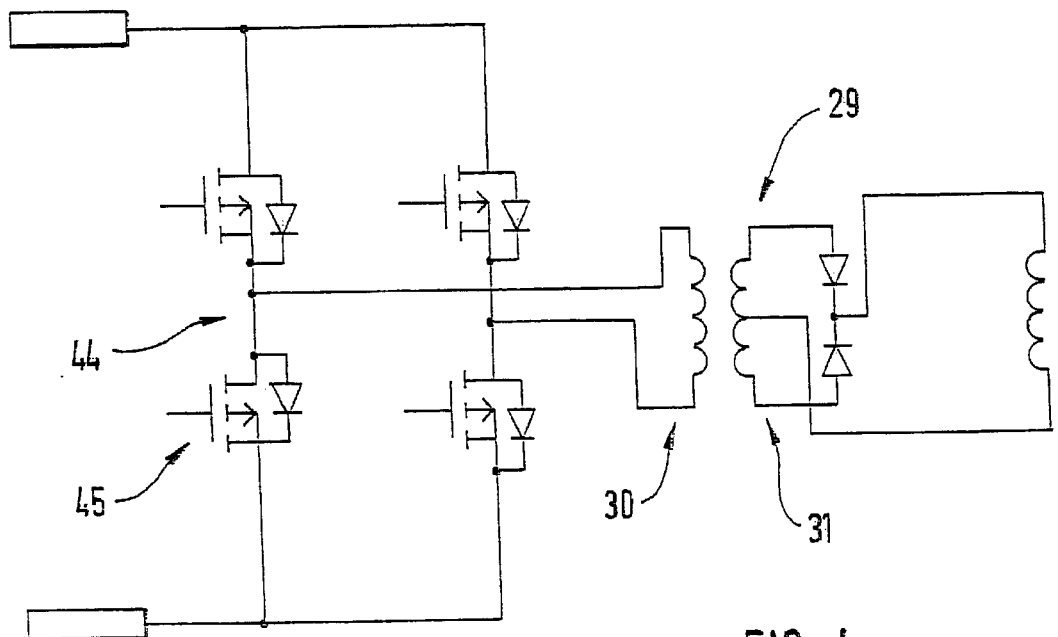
Figure 4B:
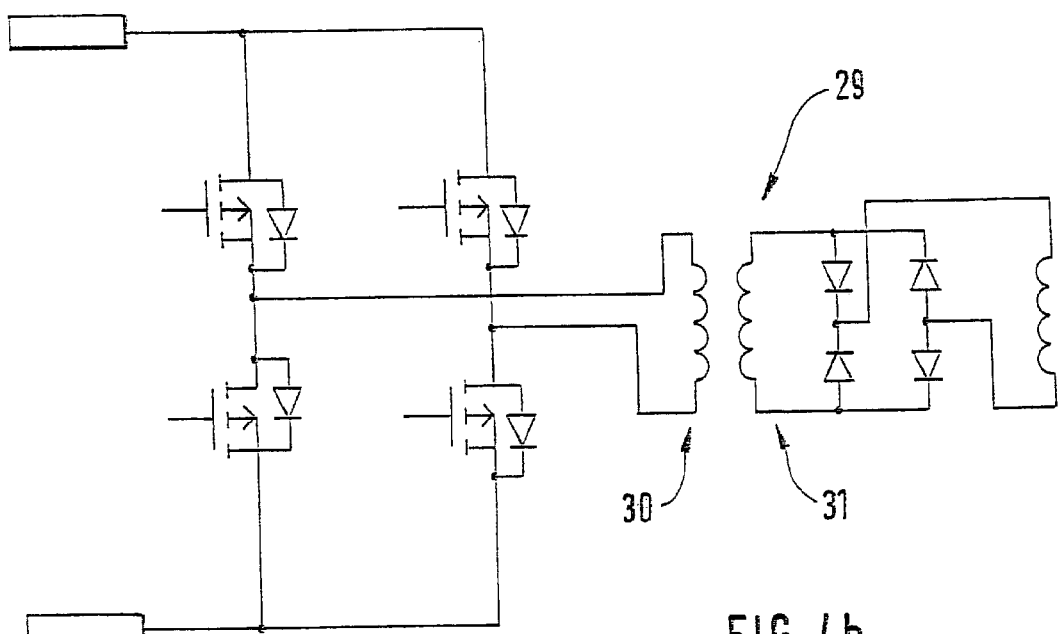
Figure 5A:
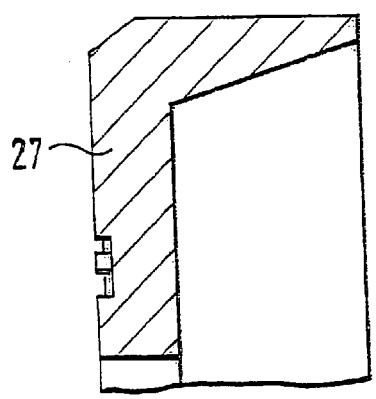
Figure 5B:
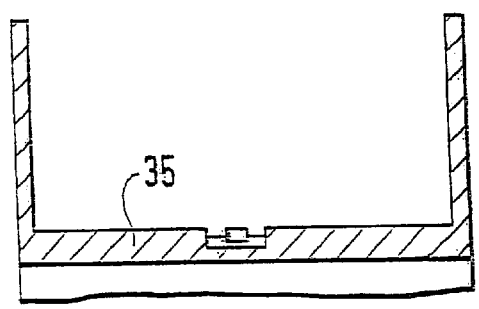
Figure 5C:
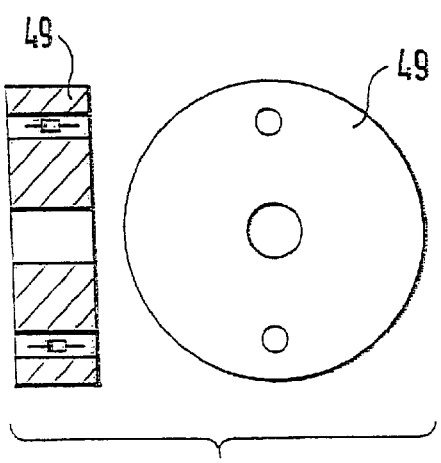
Figure 5D:
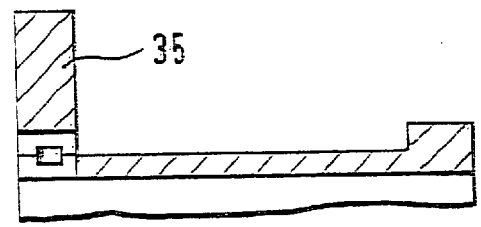

The drawing shows:

FIG. 1, a section through a so-called claw pull generator;

FIGS. 2a–2d, versions of the repeater core;

FIGS. 3a and 3b, embodiments of the repeater winding;

FIG. 4, a circuit of the inverter bridge and the rectifier circuit of the repeater on the primary and secondary sides;

FIGS. 5a–5d, variant fastenings for the diodes and the rotor; and

Figure 6:
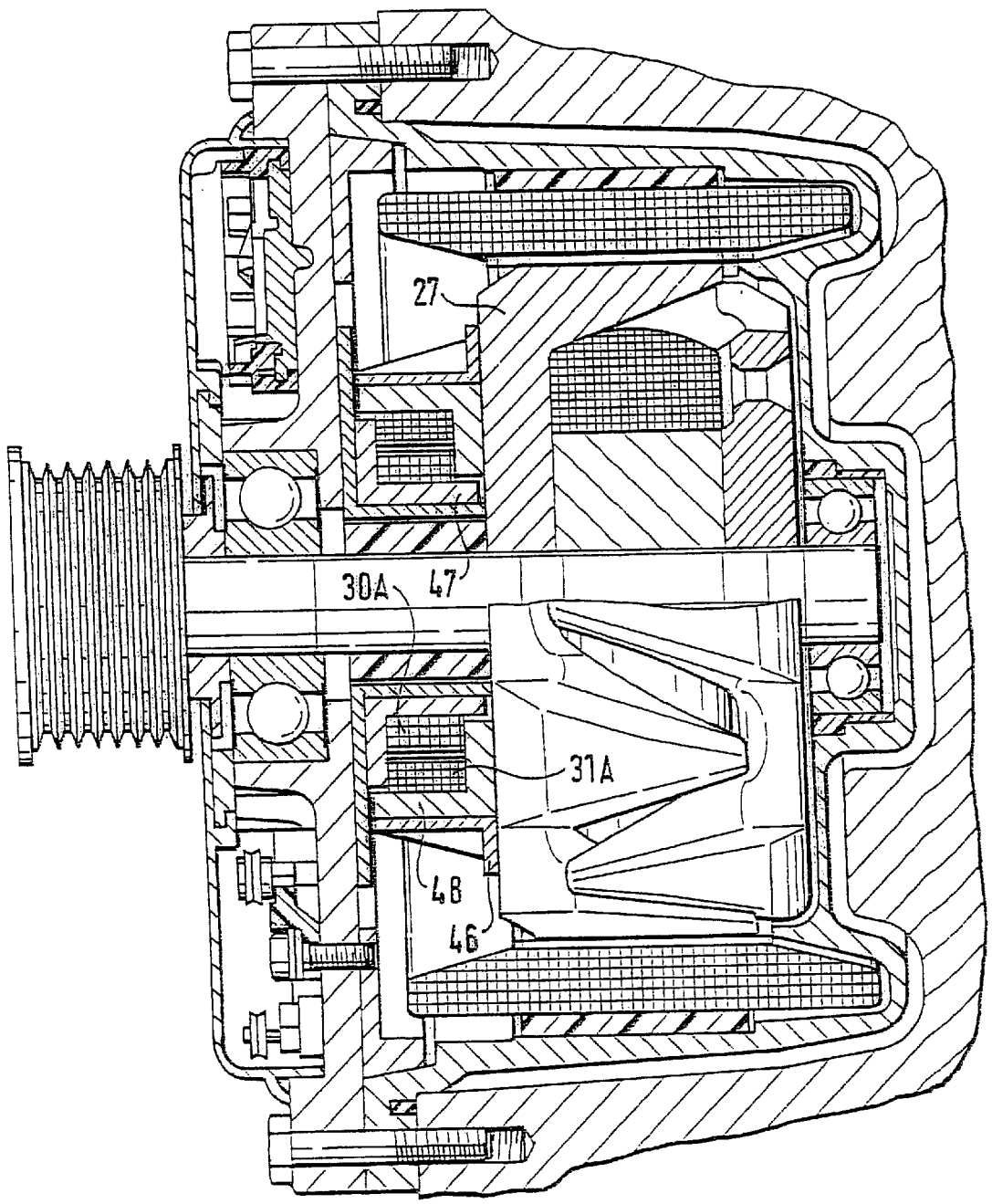

FIG. 6, a half section through a claw pull generator, in a slight modification thereof compared with FIG. 1.

DESCRIPTION OF THE EXEMPLARY EMBODIMENTS

The generator of FIG. 1 has an approximately cup-shaped housing 10, onto whose bottom a hub 11 is formed; the hub receives a ball bearing 12 in which the inner end of a shaft 13 is supported. The other end of the shaft is supported in a ball bearing 14, which is disposed in a hub 16 of a bearing plate 17 that closes off the housing on the drive side. On the bearing plate, toward the outside, a cooling body 18 of a bridge rectifier, not shown in further detail, and a regulator 19 are disposed in a manner known per se. The entire arrangement is closed off by a bearing cap 20. A stator 21 with a three-phase winding is disposed in the housing 10.

Approximately in the middle of the housing 10 and its interior, a so-called claw pole rotor system 23, known per se, is disposed on the shaft 13; it has a first pole mounting 25, embodied as half of a pole wheel and ending in claws 24 and secured to the shaft 13, and a second pole mounting 27, as a further half of a pole wheel, that ends in claws 26; the respective tips of the claws 24 of one pole mounting extend into the gaps between the claws 26 of the other pole mounting. The claws 24 and 26 extend substantially parallel to the longitudinal axis of the shaft 13. An exciter winding 28 is disposed between the claws of the claw pole rotor system 23, on a pole core 32 which is also firmly mounted on the shaft 13.

For supplying energy to the exciter system of the generator, a repeater 29 is provided, which has an outer, annular primary winding 30 on a soft, magnetic core 36 and concentric with it an inner, also annular secondary winding 31 on a further soft, magnetic core 35; these windings extend in the same plane, which extends perpendicular to the longitudinal axis of the shaft 13, and the inner core 35 is secured to a shaft bush 37 that is firmly seated, magnetically inoperatively, on the shaft 13. The outer core 36 and its winding 30 are firmly screwed to the inside of the bearing plate 17 in a nonmagnetic retaining ring 39. The parts of the repeater 29 are essential to the invention and will now be described in further detail.

As FIGS. 2a–2d show, the primary winding 30 and the secondary winding 31 are located in the annular so-called cores 35, 36, which are disposed between the pole mounting 27 and the bearing cap 17. In the exemplary embodiment of FIG. 2a, the inner core 35, of U-shaped cross section, is disposed on the shaft 13 in a manner fixed against relative rotation, for instance on the bush 37 that surrounds the shaft 13 and rotates with it. Located inside it is the rotating secondary winding 31, while the outer core 36, also of U-shaped cross section, is stationary with the primary winding 30. Between the legs of the two cores, a radial air gap 38, through which the magnetic alternating field of the repeater 29 passes, is formed. In addition, the stationary, outer core 36 is firmly retained by the retaining ring 39, which in the exemplary embodiment of FIG. 1 is screwed to the bearing cap 17.

Figure 2A:
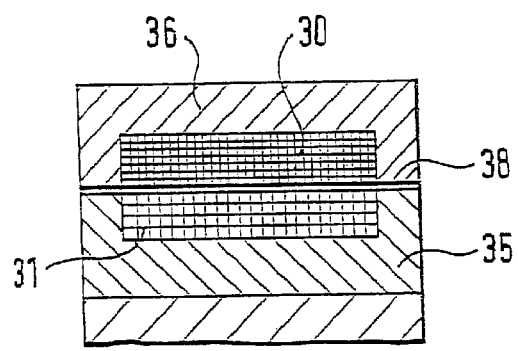
Figure 2B:
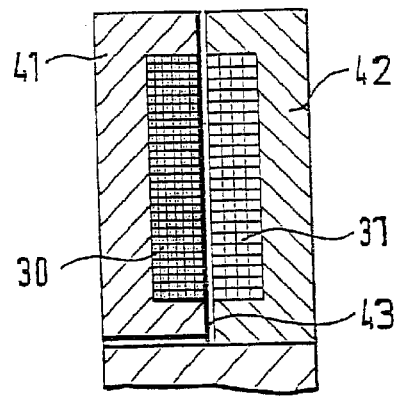
Figure 2C:
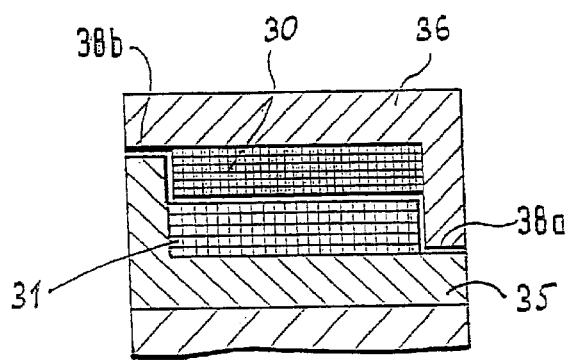
Figure 2D:
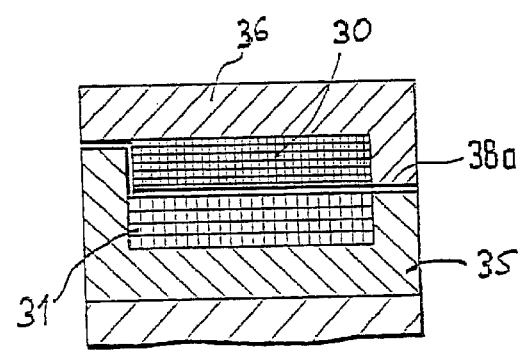

In the exemplary embodiment of FIG. 2b, the cores—now identified by reference numerals 41, 42—are disposed axially next to one another, with an also axial air gap 43. Once again, the cores have a U-shaped cross section, and the two open sides face one another. The core 41 with the primary winding 30 is again firmly connected to the bearing plate 17, preferably being screwed to it. In the exemplary embodiments of FIGS. 2c and 2d, the cores 35 and 36 are L-shaped, disposed concentrically one above the other, and are provided with axial air gaps 38a and 38b. The cores 35 and 36 are each of soft, magnetic material that is suitable for high frequencies, especially for use in a liquid-cooled generator. It should also be noted that the example of FIG. 2c having the L-shaped cores 35 and 36 the advantage that prefabricated windings 30, 31 can be used, or that the windings 30, 31 can be wound more easily. The example of FIG. 2d has the advantage of reduced magnetic resistance, since the area of the air gap 38b is increased because of the increased diameter.

It should also be pointed out that both the rotating and the stationary core 35 and 36, respectively, advantageously comprise different materials; that is, the stationary core 36 in particular comprises low-loss pressed material of high magnetic quality but low strength, and the rotating core comprises a material of higher strength but poorer magnetic properties, such as ferrite.

The primary winding and the secondary winding can either comprise individual wires as in FIG. 3a or band material as in FIG. 3b, in order to keep the stray inductance low. An insulating foil 31a and an electrically conductive foil 31b are wound onto the core 35, one above the other.

The electrical triggering of the primary winding 30 is effected with a regulated alternating voltage via an inverter 44 with triggerable semiconductors 45 in a so-called H bridge. On the secondary side (secondary winding 31), rectification is effected via a so-called two-way rectifier circuit as in FIG. 4a or via a rectifier bridge circuit as in FIG. 4b. The secondary winding 31 is electrically conductively connected to the exciter winding 28. The repeater 29 thus transmits an exciter power to the exciter winding 28.

In a manner known per se, with the generator running, the output voltage of the regulator 19 is sensed, and as a function of the load on the generator, the inverter 44 is triggered with a predetermined frequency in such a way that the repeater 29 allows an exciter current, which increases as the load increases, to flow through the exciter winding 28 via the rectifier on the secondary side.

In FIG. 5, alternatives for the disposition and fastening of the rotating diodes or the rectifier module are shown. Examples are anchoring them to the mounting 27 of the rotor in FIG. 5a, fastening them in the coil body under the secondary winding in Example 5b, anchoring them in a bush mounted on the shaft in FIG. 5c, and fastening them in a recess of the transmission material in FIG. 5d.

In the exemplary embodiment of FIG. 6, unlike FIG. 1, the inner core 47 is disposed in stationary fashion on the bearing plate 17 and secured, while the outer core 48 is disposed to rotate with the pole mounting 27. The outer secondary winding 31A rotates, while the inner primary winding 30A is stationary. Consequently, here the rotating core 48 is received in a retaining ring 46, which is secured to the face end of the pole mounting 27.

By means of the provisions described, at the high centrifugal stresses that occur particularly in motor vehicle generators, the core material of the repeater 29 is stressed only for pressure. This arrangement offers the additional advantage that if the cores are damaged, fragments cannot get into the generator interior.

What is claimed is:

1. An electrical machine, in particular a three-phase generator, having a stator (21) secured in a housing, having a claw pole rotor (23) that has an exciter winding (28) and is secured to a shaft (13), and having a repeater (29), laterally adjoining the claw pole rotor (23), with primary and secondary windings (30; 31) that each disposed on a respective core (36, 41, 47; 35, 42, 48) of soft magnetic material and are magnetically coupled to one another via an air gap (38), and the repeater (29) transmits an exciter power to the exciter winding (28), and the repeater (29) is disposed between the claw pole rotor (23) and a bearing plate (17) that closes off the housing (10) of the three-phase generator, the primary winding (30) is disposed together with the associated stationary core (36,41, 47) on the bearing plate, and the stationary core (36) that receives the primary winding (30) is located radially outward, while the radially inner core (35) that receives the secondary winding (31) is disposed to rotate with the shaft (13), the outer core (36, 48) is received in a retaining ring (39, 46) the outer core (48) rotates with the claw pole rotor (23), and the retaining ring (46) is secured to the claw pole rotor (23), preferably on the face end thereof.

2. The machine of claim 1, wherein the stationary core (36) and the rotating core (35) have a U- shaped cross section, and an air gap (38) is formed between the ends of the legs.

3. The machine of claim 1, wherein both the rotating and the stationary core (36, 35) have an L-shaped cross section, and that one air gap (38a, 38b) is formed on each of the two sides between the primary and secondary windings (30, 31).

4. The machine of claim 1, wherein the stationary and the rotating core (41, 42) have a U-shaped cross section and are disposed axially next to one another.

5. The machine of claim 1, wherein the rotating core (35) is supported on a bush (37) disposed on the shaft (13).

6. The machine of claim 1, wherein the stationary core (47) is disposed radially on the inside, and the rotating core (48) is disposed radially on the outside and in the same plane as the stationary core (47).

7. An electrical machine, in particular three-phase generator, having a stator (21) secured in a housing, having a claw pole rotor (23) that has an exciter winding (28) and is secured to a shaft (13), and having a repeater (29), laterally adjoining the claw pole rotor (23), with primary and secondary windings (30; 31)that each disposed on a respective core (36,41, 47; 35,42,48) of soft magnetic material and are magnetically coupled to one another via an air gap (38), and the repeater (29) transmits an exciter power to the exciter winding (28), and the repeater (29) is disposed between the claw pole rotor (23) and a bearing plate (17) that closes off the housing (10) of the three-phase generator, the primary winding (30) is disposed together with the associated stationary core (36, 41, 47) on the bearing plate, and primary and secondary windings (30, 31) comprise band material.

8. An electrical machine, in particular a three-phase generator, having a stator (21) secured in a housing, having a claw pole rotor (23) that has an exciter winding (28) and is secured to a shaft (13), and having a repeater (29), laterally adjoining the claw pole rotor (23), with primary and secondary windings (30; 31) that each disposed on a respective core (36, 41, 47; 35, 42, 48) of soft magnetic material and are magnetically coupled to one another via an air gap (38), and the repeater (29) transmits an exciter power to the exciter winding (28), and the repeater (29) is disposed between the claw pole rotor (23) and a bearing plate (17) that closes off the housing (10) of the three-phase generator, the primary winding (30) is disposed together with the associated stationary core (36, 41, 47) on the bearing plate, and the triggering of the primary winding (30) of the repeater (29) is effected via an inverter (44), while a rectification of the alternating current in the secondary winding (31) is effected via a rectifier circuit, preferably a rectifier bridge circuit.

9. An electrical machine, in particular a three-phase generator, having a stator (21) secured in a housing, having a claw pole rotor (23) that has an exciter winding (28) and is secured to a shaft (13), and having a repeater (29), laterally adjoining the claw pole rotor (23), with primary and secondary windings (30; 31) that each disposed on a respective core (36,41, 47; 35,42,48) of soft magnetic material and are magnetically coupled to one another via an air gap (38), and the repeater (29) transmits an exciter power to the exciter winding (28), and the repeater (29) is disposed between the claw pole rotor (23) and a bearing plate (17) that closes off the housing (10) of the three-phase generator, the primary winding (30) is disposed together with the associated stationary core (36,41, 47) on the bearing plate, and the rotating core (35, 42) and the stationary core (36, 41) comprise different materials.

10. The machine of claim 9, wherein the stationary core (36,41) comprises low-loss material, in particular sintered material or powdered metal, of high magnetic quality but lower strength than the rotating core (35, 42).

11. The machine of claim 9, wherein the rotating core (35, 42) comprises a material with high strength but poorer magnetic properties than the stationary core (36, 41), and in particular comprises ferrite.

* * * * *